May 2, 1944.  C. C. BELL  2,347,728
COATING MATERIAL SPRAY RECOVERY MEANS
Original Filed Jan. 8, 1940  3 Sheets-Sheet 1

INVENTOR
Charles C. Bell
By his Attorney
Victor Cobb

May 2, 1944.   C. C. BELL   2,347,728
COATING MATERIAL SPRAY RECOVERY MEANS
Original Filed Jan. 8, 1940   3 Sheets-Sheet 2

INVENTOR
Charles C. Bell
By his attorney
Victor Cobb

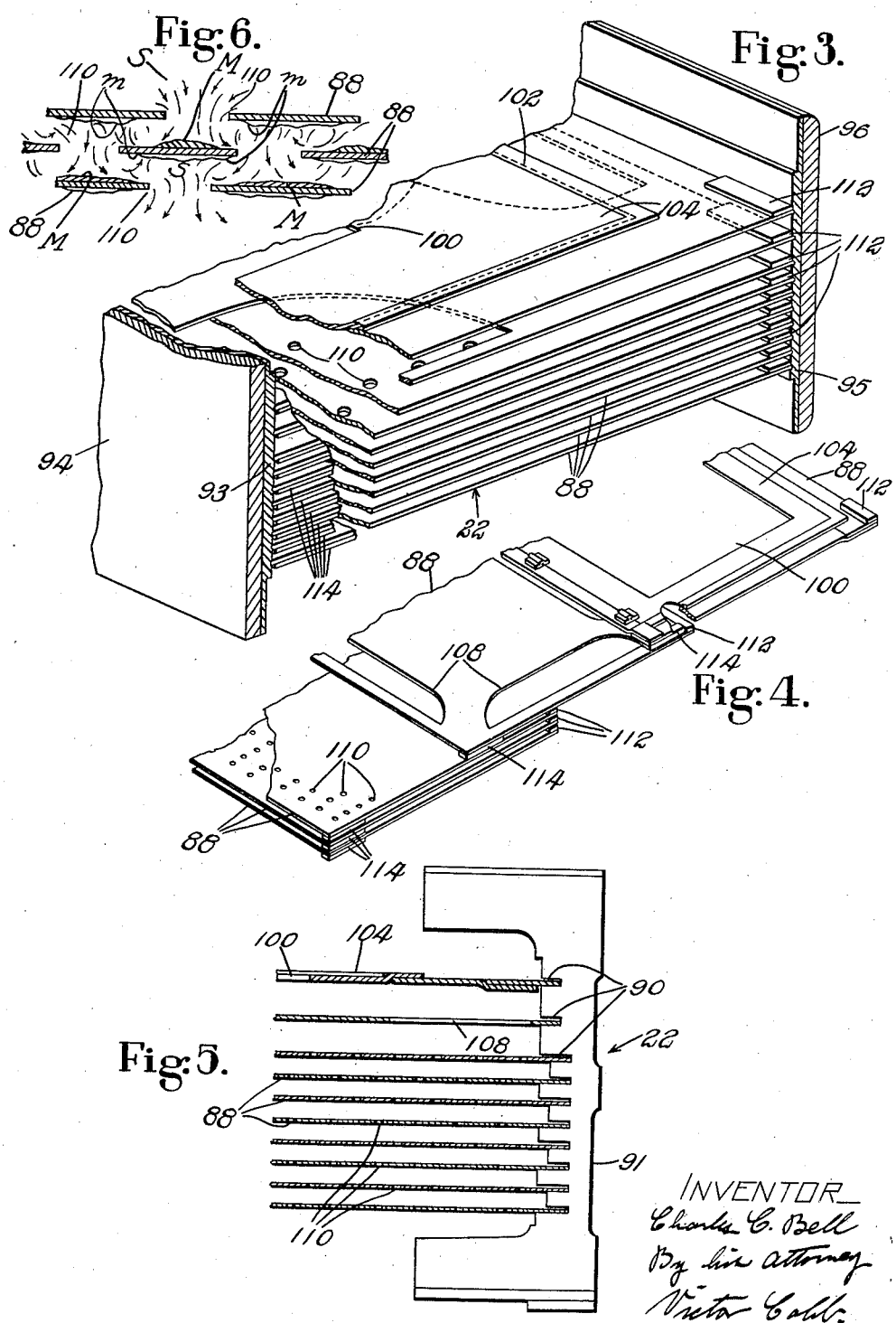

Patented May 2, 1944

2,347,728

UNITED STATES PATENT OFFICE 2,347,728

COATING MATERIAL SPRAY RECOVERY MEANS

Charles C. Bell, Marblehead, Mass., assignor to United Shoe Machinery Corporation, Flemington, N. J., a corporation of New Jersey Original application January 8, 1940, Serial No. 312,848. Divided and this application December 7, 1940, Serial No. 368,969

6 Claims. (Cl. 183—107)

This invention relates generally to an improved spray booth for use in the manufacture of shoes or other articles where highly volatile materials, such as paint, lacquer, latex, etc., are sprayed, to prevent the dissemination of the spray through the room with the consequent discomfort to the operators, and to baffles for separating the atomized coating material from the gaseous constituent of the spray thereby to recover as much of the stray coating material as practical.

Heretofore, in many spray booths part of the stray atomized coating material settled on the walls of the booth and the remainder, together with the gaseous constituent of the spray, escaped into the room, little or no attempt being made to recover the stray coating material. It has been found that about 80% of the coating material atomized and projected from a spray gun is wasted because it does not fall on the work being coated by the spraying operation, and it is, therefore, desirable to construct a spray booth so that as large a proportion of this stray atomized coating material may be recovered as is possible and the gaseous constituent may be disposed of without annoyance to the operator. While some recovery has been made heretofore by catching the atomized coating material on a cheesecloth screen, this was not wholly satisfactory because while the cloth, when fresh, was efficient in catching the atomized coating material, after a short time it became so clogged up that it no longer operated as a filter and, if it were not changed by the operator often enough, the gaseous constituent and some of the atomized coating material escaped from the booth into the room.

It is an object of the present invention, therefore, to construct a spray booth which will recover the stray atomized coating material and minimize the tendency for the gaseous constituent and stray atomized coating material to escape into the operator's face, and which is compact and self-sufficient and readily operable by unskilled help.

As illustrated herein, a plurality of baffle plates are provided which are so designed that they will function efficiently for prolonged periods without the necessity of cleaning. The baffles consist of a stacked series of parallel, closely spaced plates. The top plate has a relatively large opening therein through which the spray is drawn against the second plate. The second plate is imperforate opposite the opening in the first plate, but has openings at its edges laterally of the openings in the first plate. Accordingly, the spray, when drawn through the opening in the first plate, strikes the imperforate portion of the second plate and a large portion of the atomized coating material is thereby deposited on the second plate. Thereafter, the partly filtered spray is drawn laterally between the bottom surface of the first plate and the top surface of the second plate into the openings along the edges of the second plate so as to wipe every portion of the spray against the surfaces of the plates and to cause the maximum amount of deposit of the atomized coating material contained therein on the surfaces of the plates as it progresses through the plates. Below the second plate is a third plate and a series of corresponding parallel plates having relatively small openings therein which are uniformly distributed over their entire surface, the openings in adjacent plates being staggered with respect to each other. The nearly filtered spray passes through the third and succeeding plates and is progressively broken up by the staggered openings therein in such a manner as to remove substantially all the atomized coating material.

A large proportion of the atomized coating material is deposited on the first and second baffle plates and it is desirable to be able to clean these plates without disturbing the remaining plates. The top plate may be readily cleaned by reaching into the booth and stripping the coating material from its surface. To make the entire surface of the second plate accessible, the first plate, according to a feature of the invention, has a relatively large centrally disposed opening therein, the opening being occupied by a panel which is hinged to the top plate and which may be tilted back to expose the entire surface of the second plate for cleaning. The panel, in turn, is provided with an aperture through which the spray passes to the second plate.

The closeness of the baffle plates makes it difficult to withdraw the same for cleaning purposes since the edges of the plates afford no opportunity for gripping them. With a view to facilitating the removal of the individual plates, another feature of the invention is found in means associated with the stacked series of baffle plates whereby withdrawal of any plate in the series beyond a predetermined point from the stack will start to draw the plate below it from the stack.

The spray booth embodying the features related will now be described in detail with the aid of the accompanying drawings, in which Fig. 1 shows an angular view of the complete booth;

Fig. 3 shows a fragmentary section of the booth to illustrate the arrangement of the baffles;

Fig. 4 shows the baffle plates in extended position;

Fig. 5 shows the spacing of the baffle plates; and

Fig. 6 shows a greatly enlarged fragmentary section of the lower baffle plates illustrating the accumulation of material in mounds below each opening.

Figure 1:
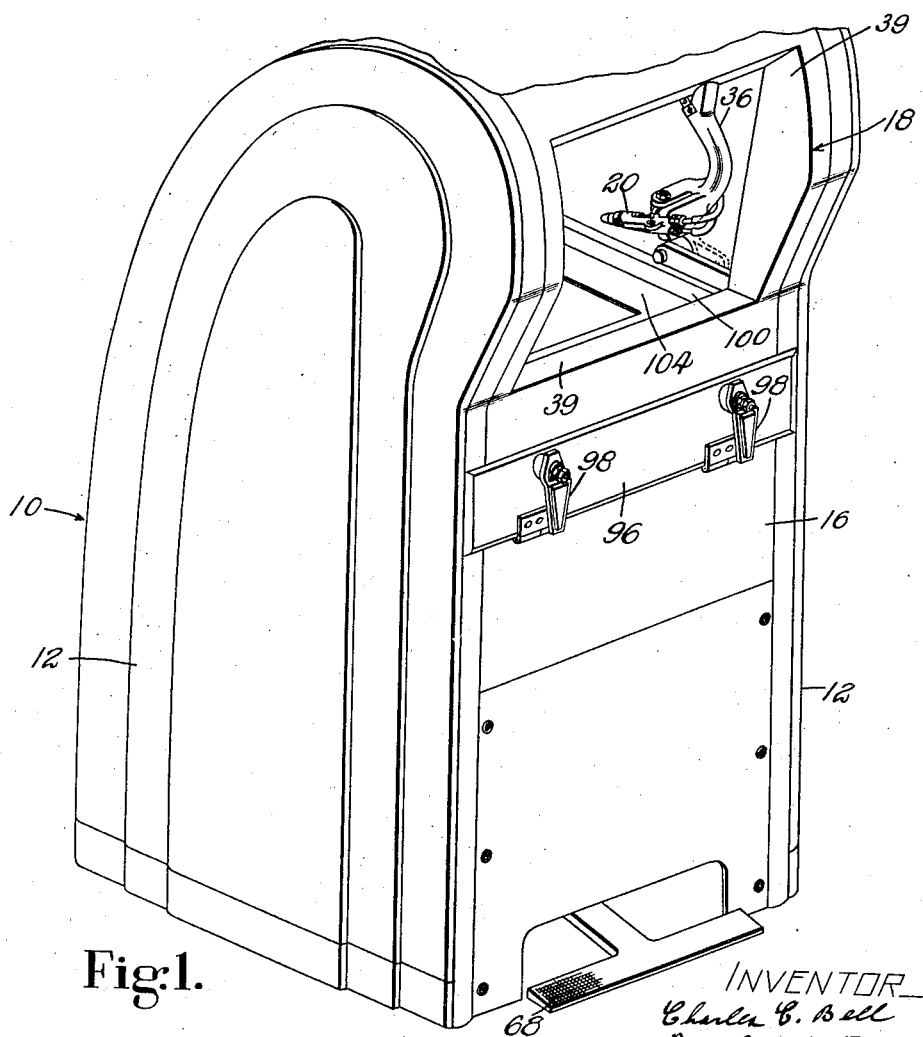
Figure 2:
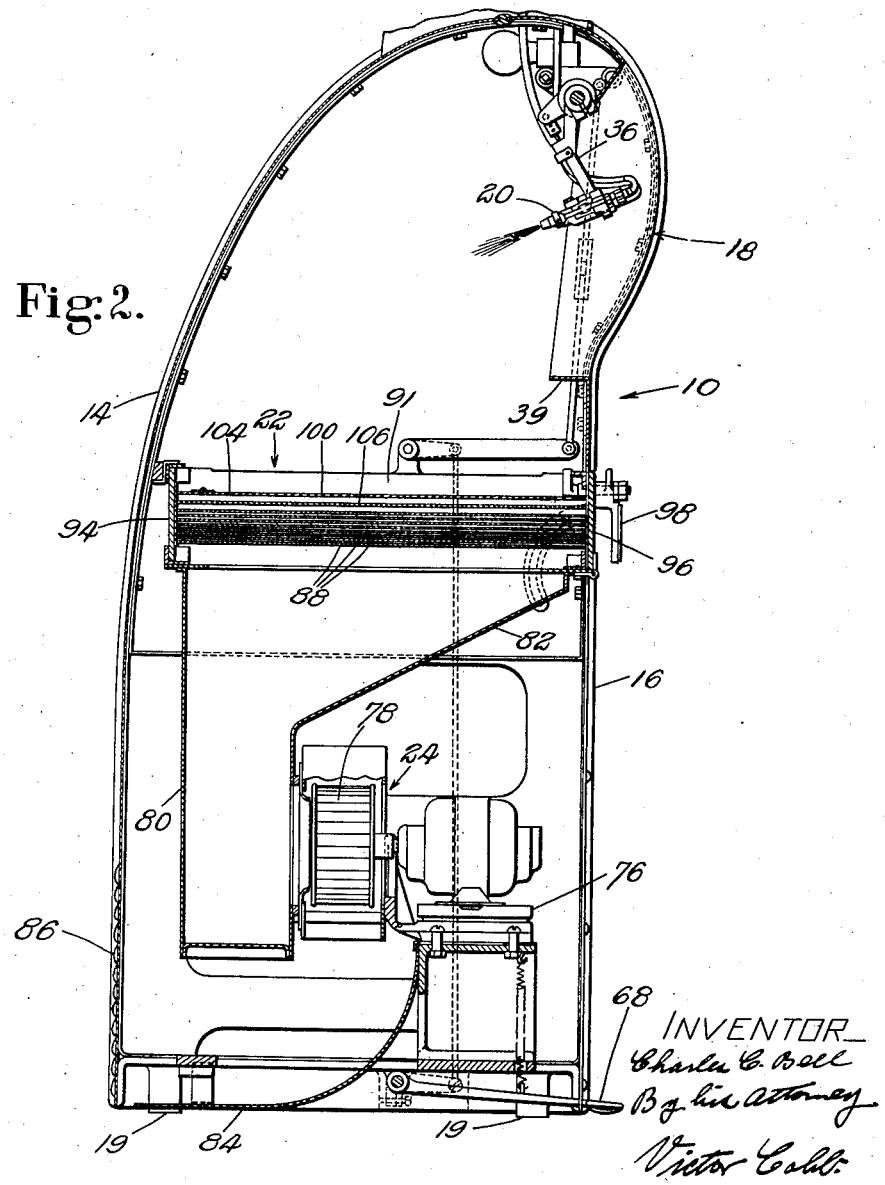
Fig. 2 shows a vertical section through the booth.

The spray booth embodying the features of the present invention is shown in Fig. 1 as comprising in general a rectangular booth 10 made up of end members 12, a back 14 which extends forwardly over the top, and a front 16 having an opening 18 therein to permit access to the interior of the booth, the booth being supported from the floor by legs 19 (Fig. 2). The booth houses a spray gun 20, a separator consisting of a series of baffles indicated generally at 22 (Fig. 2), and an exhaust unit 24.

In order to reduce, so far as possible, the tendency for the spray, which consists of atomized coating material and the gas employed to bring about atomization at the nozzle of the spray gun, to escape through the opening 18 into the room, the spray gun is mounted on a bracket 36 inwardly from the opening 18 and the latter is provided with comparatively wide inturned flanges 39 which serve as deflectors to turn the spray back from the opening. The position of the gun renders its operating valve inconvenient, if not inaccessible, to the operator, and a connection between a treadle 68 and the valve of the gun has been provided by which the gun may be set in operation without reaching into the booth and also so as to permit the operator to use both hands in turning the shoe or other article being sprayed. The mounting for the gun and mechanism for operating the same are described and claimed in my prior application Serial No. 312,848, filed January 8, 1940, which became Patent No. 2,310,205, issued February 9, 1943, of which the present application is a division, and consequently need not be recounted herein.

A large quantity of the spray directed at the work by the gun either rebounds from the work or shoots wide thereof so that the booth is filled partly with stray floating particles of atomized coating material and partly with the gaseous constituent of the spray which should be prevented from escaping through the opening 18 into the room since they are disagreeable and injurious if inhaled by the operator. This is effected by the aforesaid separator and the exhaust fan unit. The separator 22 for recovering the stray atomized coating material is in the form of a stack of baffle plates which are placed below the gun and form the bottom wall of the spray chamber of the booth. While the larger of the atomized particles of the coating material tend to fall by gravity toward the baffles, the entraining of the smaller particles is augmented by air movement produced by a motor-driven exhaust fan unit 24 which is mounted on a pedestal 76 at the bottom of the booth, the fan 78 being interposed in an exhaust duct 80 the upper end 82 of which is enlarged to include the complete underside of the baffle stack 22 and the lower end 84 of which terminates close to the rear wall of the booth which at this point has been vented at 86 to permit the cleansed gaseous constituent to pass into the room. The baffle stack comprises a series of closely spaced flat plates 88 (Fig. 3) the edges of which are slidably received in grooves 90 formed in members 91 fixed to the side walls of the booth. The rear edges of the plates engage a resilient sheet 93 composed of synthetic rubber resistant to deterioration which is secured to a back plate 94 which spans the back part of the booth from side to side, while the front edges of the plates engage a similar resilient sheet 95 fixed to a hinged door 96 provided in the front wall of the booth. The door is normally locked closed by a pair of hand levers 98, as shown in Fig. 2, and the length of the plates is such that when the door 96 is closed and locked the opposite ends of the plates are forced into the resilient sheets, thereby providing a tight seal between the plates and the walls of the passage.

The top plate of the series is provided with a large rectangular opening 102 therein which is occupied by a panel 104 hinged thereto at one edge so that it may be swung upright, whereby the plate below is completely exposed for cleaning purposes. The panel 104 has a rectangular opening 100 of relatively large area therein whereby the spray in the spray chamber may be passed through to the next plate of the series of baffle plates. The second plate is imperforate over its central area but along its edges, as shown in Fig. 4, there are relatively narrow openings 108 spaced laterally of the opening 100 which permit the gaseous constituent and the remaining entrained atomized coating material to continue on through the stack. The succeeding plates 88 are similar in that each is provided with a plurality of uniformly distributed unconnected openings 110, the openings in the adjacent plates, however, being staggered so as to provide a tortuous path for the gaseous constituent and remaining entrained atomized coating material.

The advantage of the particular arrangement of baffles just described lies in the fact that the baffles remain substantially 100% effective in spite of the accumulation of atomized coating material thereon. This is due to the fact that the major portion of the atomized coating material in the spray after passing through the opening 100 in the first plate is thrown out on the second plate by the impact therewith. Since the central portion of the second plate is of relatively large area and imperforate, it will accommodate considerable material before it needs cleaning. Moreover, the openings 108 at the edges of the second plate are comparatively large and, therefore, there is no tendency for the atomized coating material to build up along the edges of the same so as to bridge the openings and stop the flow entirely. It is to be observed that the total area of the openings 108 at the edges of the second plate is less than the area of the opening 100 in the first plate. Consequently, there is a progressive increase in the velocity of the spray as it passes through the plates. When the spray reaches the third plate a considerable amount of the atomized coating material has been removed. At this point, however, due to the fact that the total area of the small holes 110 in the third plate is less than the area of the opening 100 in the first plate, the spray S (Fig. 6) acquires a further increase in velocity under the exhausting action of the fan so that as the spray shoots through these holes the atomized coating material is impelled with considerable force against the imperforate area of the plate below where it accumulates in mounds M (Fig. 6). The impact of the spray causes swirling between the plates (Fig. 6) so that every portion of the spray is wiped and rewiped against the surfaces of the baffles, thereby insuring complete removal of the atomized coating material which accumulates on the top and bottom sides of each of the plates as indicated at m. Because of the fact that the spray sweeps by the edges of the holes it does not build up at the edges of the holes but instead is wiped therefrom, leaving the holes free and clean for the passage of more spray. As the spray passes from plate to plate the atomized coating material is progressively removed by the plates until, when it reaches the last of them, scarcely any deposit is noticeable even after prolonged use of the booth.

The deposit of atomized coating material on the top plate outside the opening 100 may be scraped or peeled therefrom and that on the second plate in like manner by lifting the section 104 of the top plate about its hinged point. Access to the succeeding plates, however, is had through the door 96. Since the plates 88 are quite close together, it would be difficult to grasp their edges to pull them out and, therefore, the following provision has been made. At the front top edge of each plate there are placed two blocks 112 and at the rear bottom edge two blocks 114. When, as shown in Fig. 4, the top plate, which may be easily grasped, is pulled out to its extreme length, the blocks 114 on its bottom rear edge will engage the blocks on the top front edge of the underlying plate and start it from the stack. Each succeeding plate may be started in like manner, that is, the top plate may then be pushed back and the second plate used to start the third, etc.

When the machine is in use, the operator adjusts the angular position of the gun 20 to bring it to the most comfortable height and direction for his use, as described in the aforesaid Patent No. 2,310,205. After this preliminary adjustment, the work is held by the operator in front of the gun which is set in operation to project the coating material thereon.

After considerable use, a layer of atomized coating material builds up on the first and second baffle plates, and to remove the same it is only necessary to peel or scrape the layer therefrom, access being had to the second plate by lifting the section 104 about its hinges. The accumulation on the plates succeeding the second plate is very gradual and, therefore, requires only infrequent cleaning. When, however, it is necessary to clean these plates, the door 96 is opened and the plates pulled through the opening, thereby exposing their entire surfaces for removing the deposited material by brushing or the like.

Having described my invention, what I claim as new and desire to secure by Letters Patent of the United States is:

1. In a spray booth, a stacked series of parallel closely spaced baffle plates, the top plate having a centrally disposed rectangular opening of relatively large area therein, and a panel arranged to occupy said opening, said panel being hinged to the plate, whereby the panel may be tilted back to expose the second plate, said panel having an aperture therein.

2. In a spray booth, a stacked series of parallel closely spaced baffle plates, characterized by having means associated therewith whereby the movement of any plate in the series beyond a predetermined point from the stack will cause a plate adjacent thereto to move from the stack.

3. In a spray booth, a stacked series of parallel closely spaced baffle plates, and means associated with each of the plates in the stack whereby the succeeding plate may be started from the stack so that it may be exposed by pulling an adjacent plate partly from the stack.

4. In a spray booth, a stack series of parallel closely spaced baffle plates, and blocks on the upper front edge and lower rear edge of each plate whereby movement of any one plate from the stack will bring the blocks on the lower edge of said one plate into engagement with the blocks on the upper front edge of the adjacent plate, continued movement of said one plate from the stack thereafter starting the next plate from the stack.

5. In a spray booth, an exhaust passage for carrying away the unused spray, said passage having walls provided with grooves for the reception of a series of parallel closely spaced baffle plates, one wall of the passage having a hinged portion which may be opened out to expose the edges of the plates, and means to start any one of the plates from the confine of the passage by pulling the plate above it through said opened-out portion of the wall a predetermined distance.

6. In a spray booth, an exhaust passage for carrying away unused spray, and a series of parallel closely spaced baffle plates for recovering the solid matter from the unused spray, said passage having side walls provided with grooves for the reception of the edges of the baffle plates, and front and back walls, the front wall being hinged so that it may be opened out to expose the front ends of the plates, a sheet of resilient material on the front and back walls opposite the ends of the plates, the plates being of such length that when the door is closed the front and back ends of the plates will be forced into the resilient sheets to provide a tight seal at the ends of the plates.

CHARLES C. BELL.